(12) United States Patent
Wu

(10) Patent No.: US 10,452,163 B2
(45) Date of Patent: Oct. 22, 2019

(54) TOUCH SYSTEM AND CONTROL METHOD THEREOF

(71) Applicant: InnoLux Corporation, Jhu-Nan, Miao-Li County (TW)

(72) Inventor: Ching-Hsin Wu, Jhu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/975,079

(22) Filed: May 9, 2018

(65) Prior Publication Data
US 2018/0335861 A1 Nov. 22, 2018

(30) Foreign Application Priority Data
May 18, 2017 (CN) .......................... 2017 1 0350690

(51) Int. Cl.
*G06F 3/0354* (2013.01)
*G06F 3/041* (2006.01)

(52) U.S. Cl.
CPC ........ *G06F 3/03545* (2013.01); *G06F 3/0416* (2013.01); *G09G 2310/0264* (2013.01); *G09G 2310/08* (2013.01)

(58) Field of Classification Search
CPC .......................... G06F 3/03545–03546; G06F 2203/041–04113; G06F 3/041–0428; G06F 1/1643; G06F 1/169–1698; G06K 9/32–3283
See application file for complete search history.

(56) References Cited

U.S. PATENT DOCUMENTS

| | | | | |
|---|---|---|---|---|
| 2009/0167726 A1* | 7/2009 | Sprague | .............. | G06F 3/03542 345/179 |
| 2016/0092010 A1* | 3/2016 | Agarwal | ............... | G06F 3/0412 345/173 |
| 2016/0274700 A1* | 9/2016 | Mishalov | ............... | G06F 3/0418 |
| 2016/0370915 A1* | 12/2016 | Agarwal | ............... | G06F 3/0416 |

* cited by examiner

*Primary Examiner* — Sanghyuk Park
(74) *Attorney, Agent, or Firm* — Muncy, Geissler, Olds & Lowe, P.C.

(57) ABSTRACT

A control method of a touch system is provided. The touch system includes a touch device and an active pen, the touch device comprises a touch display panel, a timing control circuit, and a touch detection circuit electrically connecting to the timing control circuit. The control method comprises steps of: outputting a beacon signal with a frequency from the active pen; detecting the beacon signal by the touch detection circuit; adjusting a refresh frequency of the touch display panel to be equal to a frequency of the beacon signal when the refresh frequency of the touch display panel is different from the frequency of the beacon signal; and transmitting a start trigger signal of a frame of the adjusted refresh frequency by the timing control circuit after a delay time.

20 Claims, 4 Drawing Sheets

TOUCH SYSTEM AND CONTROL METHOD THEREOF

CROSS REFERENCE TO RELATED APPLICATIONS

This Non-provisional application claims priority under 35 U.S.C. § 119(a) on Patent Application No(s). 201710350690.7 filed in People's Republic of China on May 18, 2017, the entire contents of which are hereby incorporated by reference.

BACKGROUND

Technical Field

This disclosure relates to a touch system and a control method thereof that can improve the precise positioning of the active pen or reduce the malfunction of the active pen.

Related Art

As the progress of technology, the functions of electronic products are continuously improved. For the sake of providing high convenience, it is desired to increase the performance of the human-machine interface. For example, the touch control technology is one of the high humanized human-machine interface technologies. Currently, the touch control technology has been widely applied in many electronic products such as GPS (Global Positioning System), PDA (Personal Digital Assistant), cellular phone, palm-size PC, or information appliance. In general, the display screens of the above electronic products are usually configured with a touch panel for performing the touch control operation. In order to improve the operability or convenience, an additional stylus pen is usually provided to click, write or draw on the touch panel.

For example, an electromagnetic stylus pen is usually divided into an active type stylus pen (active pen) and a passive type stylus pen. The active pen can actively emit an electromagnetic signal to the touch device, so that the touch device can obtain the touch action and operation of the active pen. However, in known applications of the active pen, the drive circuit of the display of the touch device can usually interfere the electromagnetic signal outputted from the active pen, which will cause the non-precise positioning of the active pen or the malfunction of the active pen.

SUMMARY

This disclosure provides a control method of a touch system. The touch system includes a touch device and an active pen. The touch device comprises a touch display panel, a timing control circuit, and a touch detection circuit electrically connecting to the timing control circuit. The control method comprises steps of: outputting a beacon signal with a frequency from the active pen; detecting the beacon signal by the touch detection circuit; adjusting a refresh frequency of a frame of the touch display panel to be equal to a frequency of the beacon signal when the refresh frequency of the frame is different from the frequency of the beacon signal; and transmitting a start trigger signal of the frame after the refresh frequency is adjusted by the timing control circuit after a delay time.

The disclosure also provides a touch system comprising an active pen and a touch device. The active pen outputs a beacon signal with a frequency. The touch device comprises a touch display panel, a timing control circuit and a touch detection circuit electrically connects to the timing control circuit. When the active pen operates on the touch display panel and the touch detection circuit detects the beacon signal, the timing control circuit adjusts a refresh frequency of the touch display panel and a frequency of the beacon signal to be equal to each other, and the timing control circuit transmits a start trigger signal of a frame of the adjusted refresh frequency after a delay time.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The embodiments of the disclosure will be apparent from the following detailed description, which proceeds with reference to the accompanying drawings, wherein the same references relate to the same elements.

Figure 1:
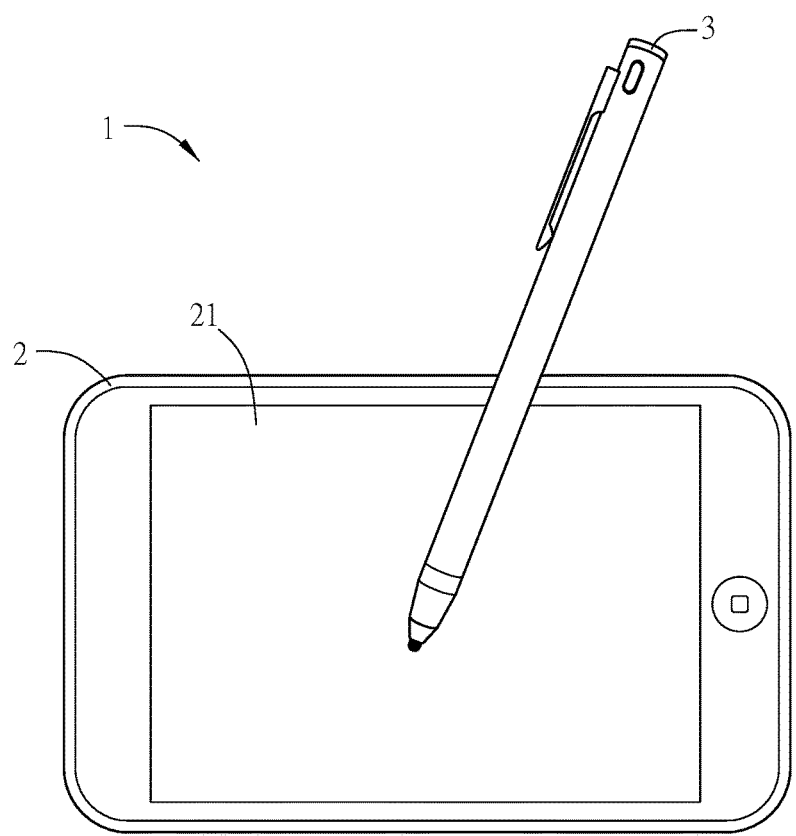
FIG. 1 is a schematic diagram showing a touch system according to an embodiment of the disclosure.
Figure 2:
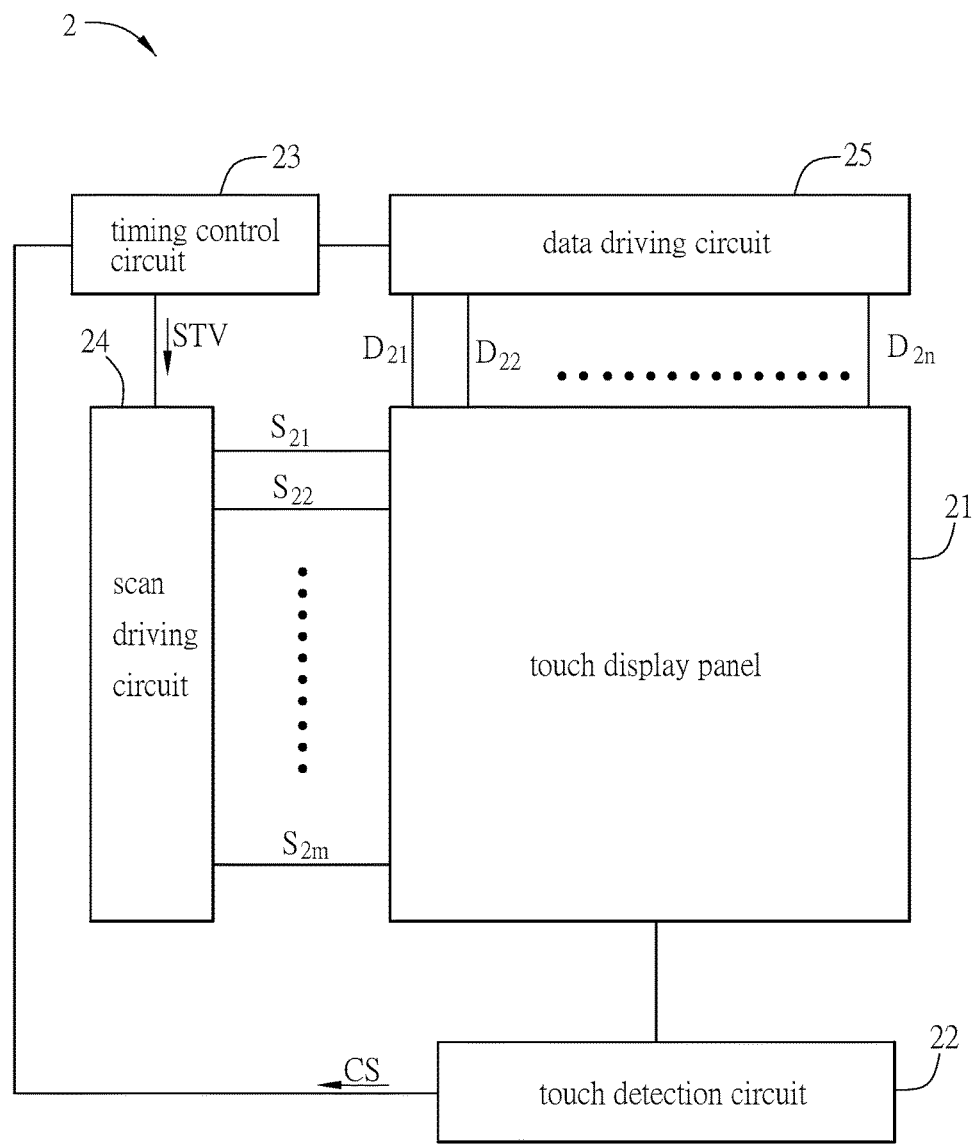
FIG. 2 is a functional block diagram of a touch device of FIG. 1.

FIG. 1 is a schematic diagram showing a touch system 1 according to an embodiment of the disclosure, and FIG. 2 is a functional block diagram of a touch device 2 of FIG. 1.

As shown in FIG. 1, the touch system 1 includes a touch device 2 and an active pen 3. The user can operate the active pen 3 on the touch display panel of the touch device 2. The touch display panel can be an out-cell touch display panel, an on-cell touch display panel, or an in-cell touch display panel, and this disclosure is not limited.

As shown in FIG. 2, the touch device 2 comprises a touch display panel 21, a timing control circuit 23, and a touch detection circuit 22 electrically connecting to the timing control circuit 23. To be noted, the connection method of the touch display panel 21, the touch detection circuit 22, and the timing control circuit 23 is not limited to the above. For example, the connection order of the touch detection circuit 22 and the timing control circuit 23 can be reversed. The active pen 3 can output electromagnetic signals or other wireless transmission signals (e.g. supersonic signals or other signals, and this disclosure is not limited). In this embodiment, the active pen 3 outputs electromagnetic signals. After the touch display panel 21 receives and analyzes the electromagnetic signals, the touch display panel 21 can execute different functions, such as the write-in function, erase function, or other functions.

The touch display panel 21 includes a display panel such as a liquid crystal display panel, an organic EL display panel, a LED display panel, an OLED display panel, or other flat display panels, and this disclosure is not limited. The touch device of this embodiment further includes a scan driving circuit 24 and a data driving circuit 25. The scan driving circuit 24 is electrically connected to the timing control circuit 23 and the touch display panel 21, and the data driving circuit 25 is electrically connected to the timing control circuit 23 and the touch display panel 21.

The touch detection circuit 22 can detect or analyze the operation and action of the active pen 3 on the touch display panel 21, and announce the display panel to execute a corresponding control. In some embodiments, the touch detection circuit 22 is an individual circuit (e.g. an IC). On other embodiments, the touch detection circuit 22 is integrated in the control circuit of the display panel.

The scan driving circuit 24 is electrically connected to the display panel of the touch display panel 21 through a plurality of scan lines $S_{21}$~$S_{2m}$, and the data driving circuit 25 is electrically connected to the display panel of the touch display panel 21 through a plurality of data lines $D_{21}$~$D_{2n}$. In addition, the timing control circuit 23 can transmit the start trigger signal (STV) and the vertical sync signal to the scan driving circuit 24, the timing control circuit 23 can convert the video signals received from the external interface into the data signal for the data driving circuit 25, and the timing control circuit 23 can transmit the data signal, the horizontal pulse signal and the horizontal sync signal to the data driving circuit 25. The scan driving circuit 24 can turn on the scan lines $S_{21}$~$S_{2m}$ in order according to the vertical sync signal. When each of the scan line $S_{21}$~$S_{2m}$ is turned on, the data driving circuit 25 can transmit the corresponding pixel voltage signal to the pixel electrode of each pixel through the data lines $D_{21}$~$D_{2n}$ corresponding to the data signal of each column of pixels. Accordingly, (the display panel of) the touch display panel 21 can display the images.

Figure 3:
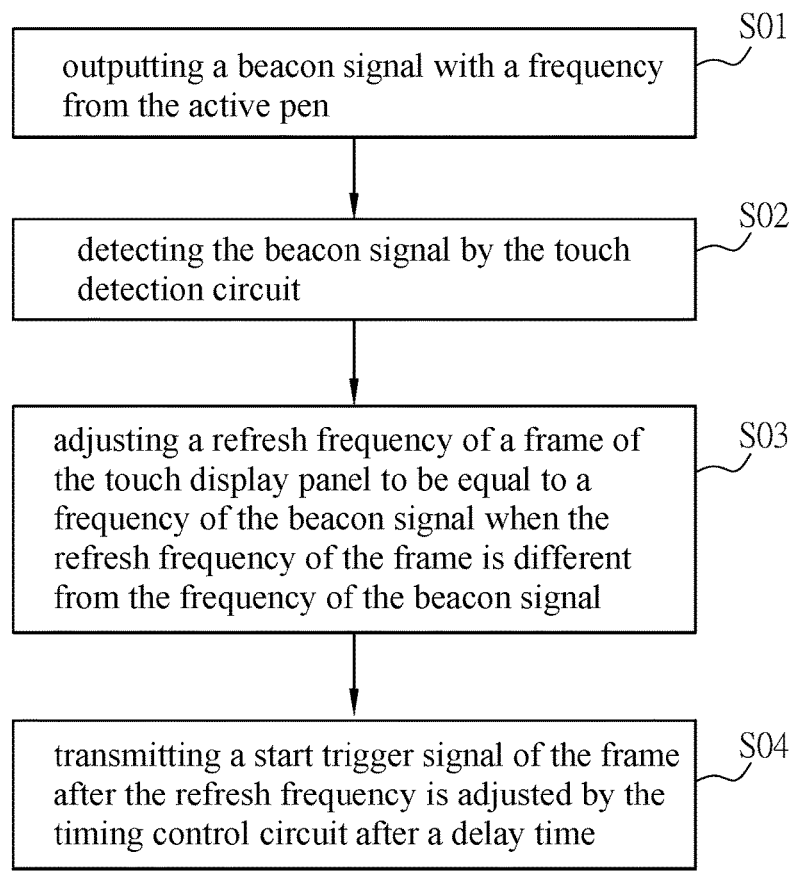
FIG. 3 is a flow chart of a control method of a touch system according to the disclosure.

FIG. 3 is a flow chart of a control method of the touch system 1 according to the disclosure.

The control method of the touch system 1 includes the following steps of: outputting a beacon signal S1 with a frequency from the active pen 3 (step S01); detecting the beacon signal S1 by the touch detection circuit 22 (step S02); adjusting a refresh frequency of a frame of the touch display panel 21 to be equal to a frequency of the beacon signal S1 when the refresh frequency of the frame is different from the frequency of the beacon signal S1 (step S03); and transmitting a start trigger signal STV of the frame after the refresh frequency is adjusted by the timing control circuit 23 after a delay time Δt.

Figure 4A:
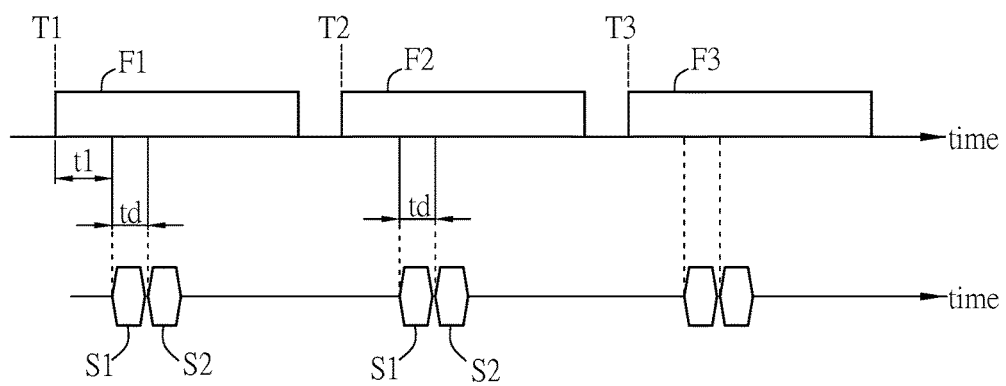
FIGS. 4A and 4B are timing charts of a touch display panel and an active pen according to an embodiment of the disclosure.
Figure 4B:
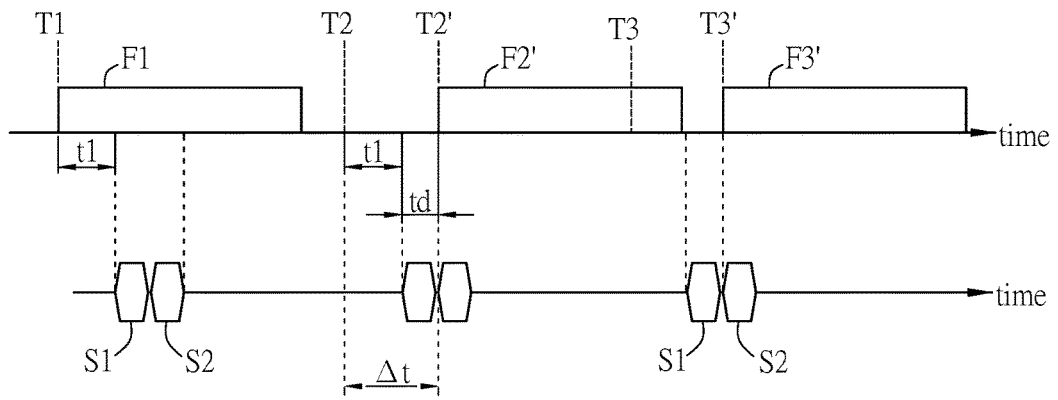

The detailed procedures and contents of the control method of this disclosure will be described hereinafter with reference to FIGS. 2 and 3 in view of FIGS. 4A and 4B. FIGS. 4A and 4B are timing charts of the touch display panel 21 and the active pen 3 according to an embodiment of the disclosure.

The active pen 3 can actively output a beacon signal S1 of a frequency (step S01). When the active pen 3 approaches or contacts the touch display panel 21 and operates on the touch display panel 21, the touch detection circuit 22 of the touch device can detect out the beacon signal S1 (step S02). When the touch detection circuit 22 detects the beacon signal S1, the touch detection circuit 22 can analyze the following actions of the active pen 3 (e.g. the time point, frequency or duration, which are collectively referred to as an operation signal S2) to obtain the operation content of the active pen 3, and transmit a control signal CS to the timing control circuit 23. Accordingly, the timing control circuit 23 can generate the following control actions corresponding to the operation of the active pen 3, so that the noise of the touch device 2 can reduce the interference of the signals of the active pen 3.

In some embodiments, the frequency of the beacon signal S1 can be a fixed frequency or another specific frequency, but this disclosure is not limited. In one embodiment, the frequency of the beacon signal S1 can be 66.6 Hz (a cycle is 15.014 ms), but this disclosure is not limited. In other words, the active pen 3 outputs a 66.6 Hz beacon signal S1, and the touch detection circuit 22 can detect the 66.6 Hz beacon signal S1.

When the refresh frequency of the touch display panel 21 and the frequency of the beacon signal S1 are different, the refresh frequency of the touch display panel 21 and the frequency of the beacon signal S1 are adjusted to be equal to each other (step S03). Herein, the refresh frequency can be adjusted by the timing control circuit 23 or other system control devices. Of course, when the refresh frequency of the touch display panel 21 and the frequency of the beacon signal S1 are the same, the synchronous action of the refresh frequency and the frequency of the beacon signal S1 can be not needed.

In this embodiment, when the refresh frequency of the touch display panel 21 and the frequency of the beacon signal S1 are different, the timing control circuit 23 can adjust the refresh frequency of the touch display panel 21 so as to make the refresh frequency of the touch display panel 21 and the frequency of the beacon signal S1 to be the same (synchronous action). In some embodiments, the original refresh frequency of the display panel is 60 Hz, and the adjusted refresh frequency is 66.6 Hz, which is synchronized with the beacon signal S1.

As shown in FIG. 4A, before adjusting the refresh frequency (the original refresh frequency is 60 Hz), the touch display panel 21 has a first frame F1, a second frame F2 and a third frame F3, which are shown continuously. The first frame F1 starts at a first time point T1, the second frame F2 starts at a second time point T2, and the third frame F3 starts at a third time point T3.

If the touch detection circuit 22 detects the beacon signal S1 emitted from the active pen 3 at a time point after a time different t1 from the first time point T1 (the time point is located within the frame time of the first frame F1), the refresh frequency of the touch display panel 21 will be synced with the beacon signal S1. The beacon signal S1 has a signal duration td, and a time point T2' for transmitting the start trigger signal is a sum of the second time point T2, the time difference t1 and the signal duration td. As shown in FIG. 4B, after adjusting the refresh frequency of the touch display panel 21 (the adjusted refresh frequency is 66.6 Hz), the new second frame F2' will be delayed by a certain of time and then displayed. In other words, the second frame F2' will start to display at the time point T2', and the third frame F3' will start to display at the time point T3'. The following frames will also be delayed based on this rule. When the refresh frequency of the touch display panel 21 is adjusted to 66.6 Hz, the time difference of two succeeding frames is 15.014 ms, which is synced with the beacon signal S1.

Finally, in the step S04, the timing control circuit 23 transmits a start trigger signal STV of the next frame (the new second frame F2') of the adjusted refresh frequency after a delay time Δt. In other words, the new second frame F2' of the touch display panel 21 will transmit the start trigger signal STV to the scan driving circuit 24 according to the adjusted refresh frequency.

If the signal duration of the beacon signal S1 is td, the time point (T2') of transmitting the start trigger signal STV after the refresh frequency is adjusted is greater than or equal to a sum of the second time point T2, the time difference t1 and the signal duration td, and is less than or equal to the third time point T3 $((T2+t1+td) \geq T2' \geq T3)$. In this embodiment, the delay time Δt is a sum of the time difference t1 and the signal duration td (Δt=t1+td), so that the time point T2' of transmitting the start trigger signal STV of the second frame F2' is equal to the sum of the second time point T2, the time difference t1 and the signal duration td (T2'=T2+t1+td). In addition, the signal duration td can be the duration of the beacon signal S1, or the signal duration td can be the sum of duration of the beacon signal S1 and the operation signal S2. The signal duration td including the duration of the beacon signal S1 and the operation signal S2 is greater than the duration of the beacon signal S1.

In some embodiments, the signal duration of the beacon signal S1 may be 1.2817 ms, but this disclosure is not limited. Herein, the touch detection circuit 22 transmits the control signal CS to the timing control circuit 23, and the timing control circuit 23 transmits the start trigger signal STV to the scan driving circuit 24 after a delay time Δt. Then, the scan driving circuit 24 starts to turn on the scan lines for displaying the second frame F2'. The control signal CS transmitted from the touch detection circuit 22, and the control signal CS comprises the time difference t1 of the beacon signal S1, the frequency of the beacon signal S1, and the likes.

When the active pen 3 leaves from the touch display panel 21, the touch detection circuit 22 cannot detect out the beacon signal S1, the refresh frequency of the touch display panel 21 can be recovered to the original value, or it can remain the adjusted value. This disclosure is not limited.

In the embodiment of this disclosure, when the active pen 3 outputs a beacon signal S1 of a frequency and the touch detection circuit 22 detects the beacon signal S1, the timing control circuit 23 adjusts a refresh frequency of the touch display panel 21 to make the refresh frequency and a frequency of the beacon signal S1 to be equal to each other, when the refresh frequency of the touch display panel 21 and the beacon signal S1 are not synced with each other. Then, the timing control circuit 23 transmits a start trigger signal STV of the next frame of the adjusted refresh frequency after a delay time Δt. This configuration can avoid the time zone of the beacon signal S1 emitted by the active pen 3, so that the noise of the touch device 2 cannot interfere the beacon signal S1.

To sum up, in the touch system and the control method thereof according to this disclosure, when the active pen outputs a beacon signal with a frequency and the touch detection circuit detects the beacon signal, the timing control circuit adjusts a refresh frequency of the touch display panel so that the refresh frequency is equal to the frequency of the beacon signal. Then, the timing control circuit transmits a start trigger signal of a frame of the adjusted refresh frequency after a delay time. Accordingly, the touch device can avoid the time zone of the beacon signal emitted by the active pen. Therefore, the disclosure can prevent the noise interfering of the signal of the active pen to improve the precise positioning of the active pen or to avoid the malfunction of the active pen.

The touch display panel may be liquid crystal display panel, Organic diodes (OLED) display panel, micro LED, or mini LED display panel, but the disclosure is not limited thereto. Detailed description, LED chip size may be defined as the existing chip about 200 to 300 microns, LED chip size of small pitch display chip may be about 150 microns, LED chip size of Mini LED may be about 50 to 60 microns, Mini LED may be regarded as Micro LED predecessor, LED chip size of the Micro LED may be only 15 microns.

It should be noted that the above "A be equal to B" may be realized as "A be substantially equal to B". In other words, A may be within a range from 90% of B to 110% of B. For example, adjusting the refresh frequency of the touch display panel to be equal to a frequency of the beacon signal means that the refresh frequency of the touch display panel is adjusted to be within a range from 90% of a frequency of the beacon signal to 110% of the frequency of the beacon signal.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A control method of a touch system, wherein the touch system comprises a touch device and an active pen, the touch device comprises a touch display panel, a timing control circuit, and a touch detection circuit electrically connecting to the timing control circuit, and the control method comprises steps of:
    outputting a beacon signal with a frequency from the active pen;
    detecting the beacon signal by the touch detection circuit;
    adjusting a refresh frequency of a frame of the touch display panel to be equal to a frequency of the beacon signal when the refresh frequency of the frame is different from the frequency of the beacon signal; and
    transmitting a start trigger signal of the frame after the refresh frequency is adjusted by the timing control circuit after a delay time.

2. The control method of the touch system according to claim 1, wherein the step of adjusting the refresh frequency is to adjust the refresh frequency of the touch display panel by the timing control circuit.

3. The control method of the touch system according to claim 1, wherein the touch display panel has a first frame and a second frame shown continuously before adjusting the refresh frequency, the first frame starts at a first time point, the second frame starts at a second time point, and the touch detection circuit detects the beacon signal after a time difference from the first time point.

4. The control method of the touch system according to claim 3, wherein the beacon signal has a signal duration, and a time point for transmitting the start trigger signal is a sum of the second time point, the time difference and the signal duration.

5. The control method of the touch system according to claim 4, wherein the delay time is a sum of the time difference and the signal duration.

6. The control method of the touch system according to claim 4, wherein the touch display panel further has a third frame shown continuously after the second frame before adjusting the refresh frequency, the third frame starts at a third time point, and a time point for transmitting the start trigger signal is greater than or equal to a sum of the second time point, the time difference and the signal duration, and the time point for transmitting the start trigger signal is less than or equal to the third time point.

7. The control method of the touch system according to claim 1, wherein in the step of transmitting the start trigger signal, the touch detection circuit transmits a control signal to the timing control circuit, and the timing control circuit transmits the start trigger signal after the delay time.

8. The control method of the touch system according to claim 7, wherein the control signal comprises the time difference and the frequency of the beacon signal.

9. The control method of the touch system according to claim 1, wherein the touch device further comprises a scan driving circuit electrically connected with the touch display panel and the timing control circuit.

10. The control method of the touch system according to claim 9, wherein the timing control circuit transmits the start trigger signal to the scan driving circuit.

11. A touch system, comprising:
an active pen outputting a beacon signal with a frequency; and
a touch device comprising a touch display panel, a timing control circuit, and a touch detection circuit electrically connecting to the timing control circuit;
wherein when the active pen operates on the touch display panel and the touch detection circuit detects the beacon signal, the timing control circuit adjusts a refresh frequency of the touch display panel and a frequency of the beacon signal to be equal to each other, and the timing control circuit transmits a start trigger signal of a frame of the adjusted refresh frequency after a delay time.

12. The touch system according to claim 11, wherein the timing control circuit adjusts the refresh frequency of the touch display panel.

13. The touch system according to claim 11, wherein the touch display panel has a first frame and a second frame shown continuously before adjusting the refresh frequency, the first frame starts at a first time point, the second frame starts at a second time point, and the touch detection circuit detects the beacon signal after a time difference from the first time point.

14. The touch system according to claim 13, wherein the beacon signal has a signal duration, and a time point for transmitting the start trigger signal is a sum of the second time point, the time difference and the signal duration.

15. The touch system according to claim 13, wherein the delay time is a sum of the time difference and the signal duration.

16. The touch system according to claim 13, wherein the touch display panel further has a third frame shown continuously after the second frame shown before adjusting the refresh frequency, the third frame starts at a third time point, and a time point for transmitting the start trigger signal is greater than or equal to a sum of the second time point, the time difference and the signal duration, and the time point for transmitting the start trigger signal is less than or equal to the third time point.

17. The touch system according to claim 13, wherein the touch detection circuit transmits a control signal to the timing control circuit, and the timing control circuit transmits the start trigger signal after the delay time.

18. The touch system according to claim 17, wherein the control signal comprises the time difference and a frequency of the beacon signal.

19. The touch system according to claim 11, wherein the touch device further comprises a scan driving circuit electrically connected with the touch display panel and the timing control circuit.

20. The touch system according to claim 19, wherein the timing control circuit transmits the start trigger signal to the scan driving circuit.

* * * * *